United States Patent [19]
Pal et al.

[11] Patent Number: 5,700,308
[45] Date of Patent: Dec. 23, 1997

[54] METHOD FOR ENHANCING REACTION RATES IN METALS REFINING EXTRACTION, AND RECYCLING OPERATIONS INVOLVING MELTS CONTAINING IONIC SPECIES SUCH AS SLAGS, MATTES, FLUXES

[75] Inventors: Uday B. Pal, Needham; Julian Szekely, Weston, both of Mass.

[73] Assignee: Massachusetts Institute of Technology, Cambridge, Mass.

[21] Appl. No.: 375,866

[22] Filed: Jan. 20, 1995

[51] Int. Cl.$^6$ ................................................. C21B 13/13
[52] U.S. Cl. .................... 75/10.1; 75/10.19; 75/10.22; 75/10.24; 75/10.35; 75/10.39; 75/10.4; 75/10.41; 75/10.42; 75/10.62; 75/10.63; 75/10.64
[58] Field of Search ................... 75/10.35, 10.1, 75/10.64, 10.19, 10.22, 10.6, 10.61, 10.62, 10.63, 10.65, 10.66, 10.24, 10.39, 10.4, 10.41, 10.42

[56] References Cited

U.S. PATENT DOCUMENTS

| | | |
|---|---|---|
| 3,203,883 | 8/1965 | Ototani et al. |
| 3,547,622 | 12/1970 | Hutchinson ............... 75/10.19 |
| 3,767,831 | 10/1973 | Plockinger et al. |
| 3,843,352 | 10/1974 | Ulrich ...................... 75/10.19 |
| 3,995,100 | 11/1976 | Jäeger |
| 4,105,437 | 8/1978 | Liu |
| 4,119,454 | 10/1978 | Rath ........................ 75/10.63 |
| 4,144,055 | 3/1979 | Petersson et al. ........ 75/10.35 |
| 4,466,824 | 8/1984 | Gauvin et al. |
| 4,740,242 | 4/1988 | Nakamura et al. ....... 75/10.12 |
| 4,764,210 | 8/1988 | Bates et al. .............. 75/10.66 |
| 4,875,985 | 10/1989 | Donahue et al. |
| 4,940,486 | 7/1990 | Sommerville et al. |
| 5,312,525 | 5/1994 | Pal et al. |
| 5,314,524 | 5/1994 | Pal et al. ................. 75/10.35 |
| 5,527,374 | 6/1996 | Pal et al. |

FOREIGN PATENT DOCUMENTS

| | | |
|---|---|---|
| 1242529 | 7/1986 | U.S.S.R. |
| WO 93 17132 | 9/1993 | WIPO |

OTHER PUBLICATIONS

Beirer et al., "One Year of Bottom Stirring Experience at Unimetal Montereau—France", ISS-AIME 11th Advanced Technology Symposium, EAF Bottom Stirring Technology, Myrtle Beach, SC, Apr. 28–30, 1991.

Glitscher et al., "Ladle Metallurgy of Special Grade Steel for Continuous Billet Casting at Krupp Stahl AG, Siegen–Geisweid Works (Federal Republic of Germany)", McMaster Symposium on Iron and Steelmaking, No. 14, pp. 157–198, May 1986.

Fujimoto et al., "Features of Ladle Refining Process at Kakogawa Works", McMaster Symposium on Iron and Steelmaking, No. 14, pp. 242–256, May 1986.

Fagionato et al., "Results of Arc Furnace Stirring at the Beltrame Steelworks in Italy", Iron & Steelmaker/ISS Publication, Jun. 1990.

Fruehan, "Ladle Metallurgy Principles and Practices", pp. 27–50; 103–110 (1985) (pp. 103–110 originally appeared in Scann inject III, Part II, pp. 35:1–35:23).

(List continued on next page.)

*Primary Examiner*—Melvyn Andrews
*Attorney, Agent, or Firm*—Choate, Hall & Stewart

[57] ABSTRACT

A method and apparatus for enhancing reaction rates between ionic species such as slags, mattes, fluxes and the like with at least another component such as similar melts, metals, chemical compounds, gases or any combination thereof during metal processing operations is provided. A dispersion of the ionic species and the other component or components is formed and contacted with a plasma or electric arc such that migration of the ionic species is facilitated and space charges in the ionic species are discharged. Reactions for decarburization, dephosphorization, desulfurization, deoxidation, alloy additions, refining, extractions and recycling processes on an industrial scale are thereby enhanced.

75 Claims, 6 Drawing Sheets

OTHER PUBLICATIONS

Szekely et al., "Ladle Metallurgy", pp. 25–72 (1989).

Wilson et al., "Desulfurization of Iron and Steel and Sulfide Shape Control", The Iron & Steel Society of AIME, pp. 1–27 (1980).

Schade, "A Second Look at Bottom Stirring in Lukens' Electric Arc Furnace", MacMaster Symposium No. 22, Enhancement of EAS Performance by Injection Technology, pp. 1–36 (May 1994).

Seekings, "Operational Experience with the Thyssen Longtime Stirring System at Manitoba Rolling Mills", MacMaster Symposium No. 22, Enhancement of EAS Performance by Injection Technology, pp. 1–30 (May 1994).

McClean et al., "Enhanced Slag–Metal Reactions", Proc. of the 4th Intl. Conf. on Molten Slags and Fluxes, pp. 268–273 (1992).

Upadhya et al., "Application of Plasma Technology in Iron and Steelmaking", Journal of Metals, vol. 36, No. 2, pp. 46–56 (Feb. 1984).

Kemeny et al., "Enhancement of Desulfurization in an Induction Furnace by Plasma–Arc Slag Heating", Electric Furnace Conference Proceedings, pp. 111–117 (1985).

Sommerville et al., "Smelting and Refining of Ferro alloys in a Plasma Reactor", Electric Furnace Conference Proceedings, pp. 31–36 (1984).

Melting  Smelting                    Refining

Decarburization Process of Stainless Steel

Decarburization Process of Stainless Steel

METHOD FOR ENHANCING REACTION RATES IN METALS REFINING EXTRACTION, AND RECYCLING OPERATIONS INVOLVING MELTS CONTAINING IONIC SPECIES SUCH AS SLAGS, MATTES, FLUXES

TECHNICAL FIELD

The present invention generally relates to a method for increasing the rate of reactions of melts containing ionic species such as slags, mattes, fluxes and the like with similar melts, metals, chemical compounds, gases or any combination thereof in metals processing operations. The invention more particularly relates to the application of an electric potential and/or the formation of an electronic pathway across the ionic melt through the use of plasma or electric arcs in conjunction with agitation and generation of dispersions to increase interfacial area of reaction.

BACKGROUND OF THE INVENTION

Virtually all metals refining, extraction, and recycling operations involve interchange of matter and chemical reactions between two or more immiscible liquid phases, one or more of which may contain ionic species. The phases that contain such ionic species are typically referred to as slags, fluxes or mattes.

During metals refining operations, undesirable elements such as impurities may be removed from the metal phase to the slag phase and/or the gas phase. For example, attempts have been made to refine metals by removing carbon, sulfur and oxygen in the metal phase as follows:

$$C+O^{2-}(\text{slag phase}) \rightarrow CO(\text{gas phase})+2e(\text{space charge in slag phase}) \quad (1);$$

$$S+Ca^{2+}O^{2-}(\text{slag phase}) \rightarrow Ca^{2+}S^{2-}(\text{slag phase})+O \quad (2); \text{ and}$$

$$2O+Si(\text{metal additive})+2O^{2-}(\text{slag phase}) \rightarrow SiO_4^{4-}(\text{slag phase}) \quad (3);$$

where C, S and O are carbon, sulfur and oxygen in the metal phase, respectively.

Additional attempts have been made to remove oxygen or sulfur from the oxide or sulfide ores during metals extraction processes. These processes lead to formation of slags or mattes and eventually the liberation of the metal itself. This is illustrated as follows:

$$Fe^{2+}O^{2-}(\text{slag phase})+C (\text{metal phase}) \rightarrow Fe^{2+}(\text{slag phase})+CO(\text{gas phase}) +2e(\text{space charge in slag phase}) \rightarrow Fe(\text{metal phase})+CO (\text{gas phase}). \quad (4); \text{ and}$$

$$Cu^{2+}S^{2-}-Fe^{2+}S^{2-}(\text{matte phase})+3/2O_2 (\text{gas phase}) \rightarrow Fe^{2+}O^{2-}(\text{slag phase})+Cu^{2+}S^{2-}(\text{matte phase})+SO_2(\text{gas phase}) \quad (5a).$$

Reaction (5a) continues as follows:

$$Cu^{2+}S^{2-}(\text{matte phase})+O_2(\text{gas phase})+Fe^{2+}O^{2-}(\text{slag phase}) \rightarrow Cu^{2+} (\text{matte/slag phase})+SO_2(\text{gas phase})+2e(\text{space charge in matte phase})+Fe^{2+}O^{2-}(\text{slag phase}) \rightarrow Cu (\text{desired metal phase})+ SO_2(\text{gas phase})+Fe^{2+}O^{2-}(\text{slag phase}) \quad (5b).$$

Further attempts have been made to separate undesirable and desirable components in metals recycling operations such that the recovered metals are in a useable or non-toxic form, e.g., the metal may be treated with flux, slag or a gas in the presence of a flux or slag to extract the undesirable component in the flux or slag. For example, copper may be separated from an iron scrap by treating the scrap with sulfur and an appropriate flux or slag to remove the copper as a sulfide. The copper sulfide may subsequently be incorporated into the flux or slag and the iron can then be recycled as a product free of copper:

$$Cu(\text{in iron})+S(\text{additive}) \rightarrow Cu^{2+}S^{2-}(\text{flux or slag phase})+Fe(\text{free of copper}) \quad (6).$$

Prior art attempts to utilize reaction mechanisms (1)–(6) set forth above have been of limited success. Such attempts have been deficient in that the reactions approach equilibrium at slower rates than desired and often equilibrium is never reached.

It is also known in the prior art to form and utilize slags during steelmaking operations to protect the metal being processed from ambient or environmental conditions. Slags frequently contain $CaO—SiO_2—Al_2O_3$ and may additionally contain various amounts of other compounds such as MgO, MnO, various S, P and C containing compounds, and the like. See, U.S. Pat. No. 5,314,524 to Pal et al. The rate of slag-metal reactions during steelmaking processes such as argon-oxygen decarburization (AOD) and vacuum-oxygen decarburization (VOD) processes for the manufacture of stainless steel, basic oxygen processes (BOP) for making low carbon steel, R-H, D-H and other vacuum degassing processes and ladle processing is a significant factor when operating on an industrial scale.

The use of electronic pathways to promote slag-metal reactions is known in the prior art. For example, U.S. Pat. No. 5,314,524 to Pal et al. referred to above relates to the use of a metallic conductor in a slag-containing crucible and the addition of a transition metal oxide to the slag to discharge the charge build up in the slag layer adjacent to and on the surface of the metal droplets. The metallic conductor used to facilitate the discharge may be in the form of a wire, a foil, a plate, a liner or a coating disposed on the interior surface of the container. In this manner, an electronic pathway with an inert metallic foil and a 2–5% iron oxide containing calcia-alumino silicate slag can be utilized to decarburize an iron-carbon melt.

It is also known in the art to apply a DC potential to an ionic melt layer disposed on the surface of a liquid metal during electrolytic processes for treating metals. U.S. Pat. No. 4,940,486 to Sommerville et al. discloses such a process in which a plasma phase is provided above an ionic melt or slag layer, thereby inducing electron flow from the liquid metal toward the plasma phase and corresponding ionic flow in the ionic melt maintaining electroneutrality. The process disclosed in U.S. Pat. No. 4,940,486 is restricted to positive polarity, i.e., the plasma phase is positive and acts as an anode.

McLean et. al., *Proc. of the 4th Intl. Conf. on Molten Slags and Fluxes, Enhanced Slag Metal Reactions*, p.268 (1992), discusses the use of a plasma to perform and promote electrolysis. The use of plasmas may aid desulfurization and facilitate the production of ferro-alloys or may be used to provide in-situ alloying. The disclosure in McLean et. al., however, is limited to small scale systems.

While the above processes have proven useful for small scale systems where a high surface to volume ratio is available, such applications are insufficient when operating industrial scale systems since excessively long reaction times would be required. This can be explained by considering the following:

The rate of slag-metal refining may be written as:

$$-\frac{dC}{dt} = h_D \frac{A}{V} [C - C_{eq}] \quad (7)$$

where C is the concentration of the species being refined in the melt, t is the time, $h_D$ is the mass transfer coefficient, A is the slag-metal interfacial area, V is the reactor volume and $C_{eq}$ is the equilibrium concentration of the species being refined at the slag-metal interface.

By virtue of the electronic potential imposed by plasma or any other means, $C_{eq}$ at best approaches zero and thus:

$$\frac{C}{C_{initial}} = e^{-h_D \frac{A}{V} t} \quad (8)$$

To obtain reasonable refining, $$\frac{h_D A}{V} t$$

must be at least of the order of unity. For typical steelmaking conditions, i.e., for 100–200 ton heats, $h_D$ is of the order of 0.01 cm/s and A/V without slag-metal dispersion is of the order of 0.01 cm$^{-1}$. Thus, t, i.e., the time constant of the reaction system, would be about 10,000 s or about 3 hours. This is unsatisfactory and impractical for industrial size operations.

For example, McLean et. al., cited above, illustrated that plasma enhanced desulfurization occurred with a time constant of about 10–15 minutes, for a 5 kg melt. The A/V values in such laboratory scale experiments is typically of the order of 5–10 cm$^{-1}$ which gives the time constant for the reaction to be about 500–1000 s or approximately 10 to 15 minutes.

Another disadvantage associated with prior art steelmaking techniques is that there is typically an excessive iron oxide build-up or accumulation in the slag. For example, prior art basic oxygen steelmaking slags usually contain about 30–40% by weight iron oxide. This is undesirable because of the iron loss in the slag. Additionally, there is a generation of excessive slag volumes. Further, there is frequently an excessive build-up of oxygen levels in the metal.

In the context of steelmaking and in additional other metals processing operations, it would therefore be desirable to provide a method and apparatus for improving reactions involving melts containing ionic species and which is suitable for use with industrial scale systems, thereby overcoming the shortcomings associated with the prior art.

SUMMARY OF THE INVENTION

It is an object of the present invention to provide a method for improving reaction rates involving ionic melts such as slags, mattes, fluxes and the like during metal processing operations, including refining, extraction and recycling.

It is another object of the invention to provide a method for increasing reactions rates involving ionic melts which are suitable for use in industrial scale systems.

It is a further object of the present invention to increase melt rates by increasing reaction rates involving ionic melts.

It is still a further object of the invention to decrease processing time by increasing reaction rates involving ionic melts.

It is yet another object of the present invention to decrease or minimize the iron oxide content in steelmaking slags.

It is still a further object of the invention to prolong refractory life during metal processing operations.

It is still a further object of the invention to decrease the slag volume produced during metal processing operations.

It is still a further object of the invention to substantially improve the recovery of alloying elements during metal processing operations.

It is still a further object of the invention to decrease the amount of oxygen in solution in the steel melt, thereby resulting in a decrease in the amount of deoxidizers needed and inclusions generated in subsequent ladle processing.

It is still a further object of the present invention to decrease the consumption of gaseous reagents.

These and other objects of the invention are provided by a method and apparatus which utilizes a dispersion of one or more reacting phases, the dispersed and/or a matrix phase being ionic, thereby increasing the total interfacial area for reaction. The method and apparatus also include the use of a plasma or an electric arc to accelerate migration of ionic species and/or to facilitate the discharge of space charges surrounding the reaction site in the ionic melt. In this manner, iron oxide build-up or accumulation in steelmaking slag (ionic melt) is minimized. When utilized for basic oxygen steelmaking, the present invention is expected to provide a slag having less, possibly much less, than 20% iron oxide.

The present invention utilizes reactions of the type set forth above at (1)–(6) involving melts containing ionic species. Under industrial conditions, these operations are typically carried out on a tonnage scale, with production levels measured in hundreds of tons or millions of tons per annum per plant. It is desirable during such operations to have high overall reaction rates, thereby reducing processing time, optimally utilizing processing equipment, and approaching equilibrium between the reacting phases. Additionally, it is desirable to minimize slag formation, reagent consumption and waste associated therewith. The present invention accomplishes these objectives and promotes migration of the ionic species to the reaction site for the reaction to occur.

Prior art techniques often result in reactions which yield electronic charges in the ionic melt. Under these conditions, electronic space charges build up or accumulate around the reaction site. Because of the low electron mobility in the ionic melt, the build up of space charges impedes the reaction and prevents the rapid attainment of equilibrium.

The present invention overcomes this problem and provides for acceleration of the migration of ionic species to the reaction site and facilitates the discharge of space charge from around the reaction site. This is accomplished through the combined use of a plasma or an electric arc to facilitate the discharge and intensive agitation of the melt by gas stirring to form a dispersion, thereby providing the necessary interfacial area for the operation of the process on an industrial scale. The present invention is suitable for use in steelmaking, refining of ferrous metals and other metals, extraction and recycling operations.

In a preferred embodiment of the invention, the dispersion of one or more of the reacting phases is formed by sufficient agitation of the bath through gas injection into the system. For purposes of the present invention, an example of a dispersion or an emulsion may be considered to be a slag and a molten metal contacted in such a manner that the slag contains a sufficient amount of metal suspended in the slag. Preferably, at least 5–50% by weight of the slag will contain metal dispersed therein. It is also preferred that the dispersed metal be in the form of droplets.

The foregoing has outlined some of the more pertinent objects of the present invention. These objects should be construed to be merely illustrative of some of the more prominent features and applications of the invention. Many other beneficial results can be attained by applying the disclosed invention in a different manner of modifying the invention as will be described. Accordingly, other objects and a fuller understanding of the invention may be had by referring to the following Detailed Description of the Preferred Embodiments.

BRIEF DESCRIPTION OF THE DRAWINGS

For a fuller understanding of the present invention, reference is had to the following description taken in conjunction with the accompanying drawings, in which:

FIG. 11 shows the use of the present invention in connection with R-H degassing techniques and the like;

Similar reference characters refer to similar parts throughout the several views of the drawings.

DETAILED DESCRIPTION OF THE PREFERRED EMBODIMENTS

Figure 1:
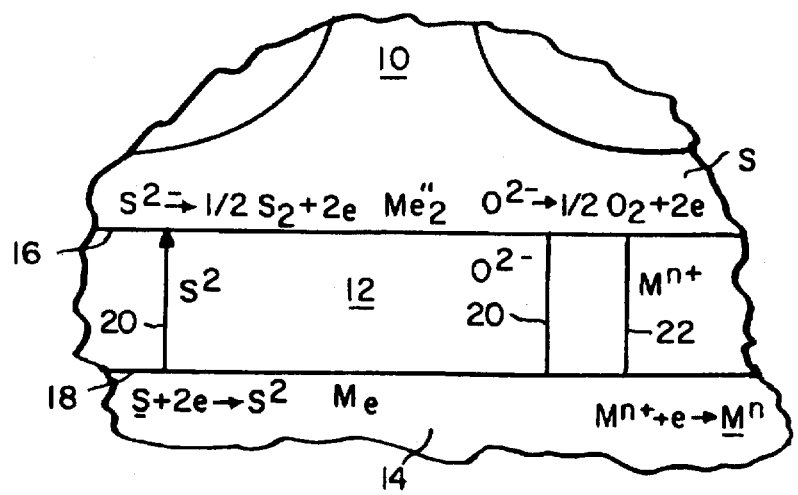
FIG. 1 illustrates a system for sulfur removal and alloy additions in accordance with the prior art.

While not meant to be limiting, one embodiment of the present invention promotes or enhances slag-metal reaction rates of the type:

$$C+O^{2-}+Fe^{3+} \rightarrow 2Fe^{2+}+CO(g) \quad (9)$$

and

$$C+O^{2-}+Fe^{2+} \rightarrow Fe+CO(g) \quad (10)$$

This is accomplished by a plasma or an electric arc in combination with intense agitation to allow the formation of a slag-metal or metal-slag dispersion or emulsion in order to increase the interfacial area for reaction. For purposes of the present invention, a dispersion may be considered to be a slag and a molten metal contacted in such a manner that the slag contains a sufficient amount of metal suspended in the slag. Preferably, at least 5–50% by weight of the slag will contain metal dispersed therein.

The present invention may be used for decarburization, dephosphorization, desulfurization, deoxidation, alternate ways of alloy additions and ferroalloy production, as well as other applications in metals extraction, recycling and refining. For example, and while not intended to be construed as limiting, the present invention is suitable for use in the following: argon-oxygen decarburization (AOD) and vacuum-oxygen decarburization (VOD) processes for the manufacture of stainless steel, basic oxygen processes (BOP) for making low carbon steel, R-H, D-H and other vacuum degassing processes, ladle processing and steelmaking using DC arc furnaces.

Decarburization or carbon oxidation during steelmaking occurs as follows:

$$\frac{1}{2} O_2(g) \rightarrow O \quad (11)$$

$$C+O \rightarrow CO(g) \quad (12)$$

where C and O are the dissolved carbon and oxygen in the iron-carbon melt. When the slag phase participates in the reaction, reaction (12) is preceded by the dissolution of oxygen ions from the slag into the iron-carbon melt through an oxidative electron transfer reaction such as:

$$O^{2-} \rightarrow O+2e \quad (13)$$

In order for reaction (13) to continue, the electrons have to be consumed by reductive electron transfer reactions involving cations having variable valences such as:

$$2Fe^{3+}+2e \rightarrow 2Fe^{2+} \quad (14a)$$

and/or

$$Fe^{2+}+2e \rightarrow Fe \quad (14b)$$

When reactions (12), (13) and (14) are combined, the following slag-metal decarburization reactions are obtained:

$$C+O^{2-}+2Fe^{3+} \rightarrow 2Fe^{2+}+CO(g) \quad (15a)$$

and/or

$$C+O^{2-}+2Fe^{2+} \rightarrow 2Fe+CO(g) \quad (15b)$$

If the liberated electrons from reaction (13) are not drained or consumed (according to reaction (14)), the overall decarburization process in reaction (15) is severely retarded. This is due at least in part to space charge build-up or accumulation around metal droplets in the dispersion. Because the slag is primarily an ionic conductor, the electrons cannot be drained and the process is limited by the electrochemical transport of $Fe^{3+}$ and $Fe^{2+}$ ions through the slag. The present invention provides an electronic path through the slag originating from the iron-carbon melt, thereby increasing the interfacial area for reaction (14). In addition, the present invention utilizes a plasma or electric arc to accelerate the migration of ionic species in the slag and/or enhances the discharge of space charge build-up in the slag around the droplets.

The present invention is also useful in dephosphorization since slag-metal dephosphorization reactions are electrochemical in nature. The electrochemical slag-metal dephosphorization reaction can be written as:

$$P + 4O^{2-} \rightarrow PO_4^{3-} + 5e \tag{16}$$

where P is the dissolved phosphorous in the metal melt.

Reaction (16) is an oxidative electronic transfer reaction. If the electrons generated in reaction (16) are drained or consumed in a manner similar to that of reaction (14), while the slag provides a source of oxygen ions, the slag-metal dephosphorization reaction will be enhanced. This is accomplished by having a slag with a source of oxygen ions, reasonable phosphate capacity to absorb phosphate ions and providing an electronic pathway to enable the slag-metal reaction to approach thermodynamic equilibrium in a rapid manner. For an effective enhancement of such slag-metal reactions in large scale processes, sufficient slag-metal interfacial area must be provided. This is accomplished by creating a dispersion through gas agitation.

For both decarburization and dephosphorization reactions, the reaction rates additionally increase as the oxidation state of the slag is increased. However, to improve yield, lower slag volume and lower oxygen content in the metal, it is preferred to decarburize or dephosphorize with a slag having the lowest oxidation state.

Slag-metal desulfurization reactions are electrochemical in nature and the rates of such reactions may be enhanced in accordance with the present invention. The electrochemical slag-metal desulfurization reaction can be written as:

$$S + 2e \rightarrow S^{2-} \tag{17}$$

where S is the sulfur in the metal phase. Reaction (17) is a reductive electron transfer reaction, and if the electrons required in reaction (17) are provided to the slag-metal interface using an electronic pathway, the sulfur removal from the metal phase will be enhanced. The electrons necessary for enhancing desulfurization reactions may be generated in the slag by decreasing the slag oxidation state, i.e., facilitating the reverse of reaction (14) by imposition of reducing conditions.

The sulfur removed from the metal phase is absorbed by the slag phase if the sulfur capacity of the slag is reasonably high or it can be transported through the slag if sulfur ion mobility is high and removed via the gas phase. See, McLean et al, *Enhanced Slag Metal Reactions*, Proc. of the 4th Intl. Conf. on Molten Slags and Fluxes, p. 268 (1992). For an effective enhancement of such slag-metal reactions in large scale processes, sufficient slag-metal interfacial area must be provided. This is accomplished by creating a dispersion or emulsion through gas agitation.

The slag can also be used as a medium to transport oxygen from the metal phase into a gas phase on top of the system. The advantage is that hydrogen and carbon containing gases having very low oxygen potentials can be used over the slag phase to extract oxygen from the metal without running the risk of contaminating the metal with any of these elements. The electrochemical oxygen transfer from the metal phase into the slag phase can be written as:

$$O + 2e \rightarrow O^{2-} \tag{18}$$

where O is the oxygen in the metal phase. Reaction (18) is a reductive electron transfer reaction, and if the electrons required in reaction (18) are provided to the slag-metal interface using an electronic pathway, the oxygen transfer from the metal phase into the slag phase will be enhanced. The electrons necessary for enhancing deoxidation reactions may be generated in the slag by decreasing the slag oxidation state, i.e., facilitating the reverse of reaction (14) by imposition of reducing conditions.

The oxygen removed from the metal phase is transported through the slag if oxygen ion mobility is high and removed via the gas phase. For an effective enhancement of such slag-metal reactions in large scale processes, sufficient slag-metal interfacial area must be provided. This is accomplished by creating a dispersion through gas agitation.

Alloy additions are electrochemical in nature and may be enhanced in accordance with the present invention. The slag-metal alloy addition reaction can be written as:

$$M^{n+} + ne \rightarrow M \tag{19}$$

where M is the alloy in the metal. Reaction (19) is a reductive electron transfer reaction, and if the electrons required in reaction (19) are provided to the slag-metal interface using an electronic pathway, the alloy addition to the metal phase will be enhanced. The electrons necessary for enhancing alloy addition reactions may be generated in the slag by decreasing the slag oxidation state, i.e., facilitating the reverse of reaction (14) by imposition of reducing conditions.

For an effective enhancement of such slag-metal reactions in large scale processes, sufficient slag-metal interfacial area must be provided. This is accomplished by creating a dispersion or emulsion through gas agitation.

It should be noted that the slag-metal refining reactions discussed above may be used with slags that foam since the gas phase diffusion proceeds at a faster rate than the electrochemical transport in the slag phase.

A system for sulfur removal and alloy additions in accordance with the prior art is shown in FIG. 1. Plasma anode 10, slag 12, and metal cathode 14 allow for sulfur removal or alloy addition through electrolysis. In particular, migration of species through the slag in the direction of arrows 20 or 22 is provided by application of external power. The amount of sulfur removed (in the direction of arrow 20) and the amount of alloy added (in the direction of arrow 22) are directly proportional to the current flowing through the system.

Sulfur removed in the direction of arrow 20 is subjected to a reduction reaction at the slag-metal interface 18:

$$S + 2e \rightarrow S^{2-} \tag{20}$$

where S is the sulfur in the metal. The sulfur ions thereby produced are removed at slag-plasma interface 16 as follows:

$$S^{2-} \rightarrow \tfrac{1}{2}S_2 + 2e \tag{21}$$

Oxygen ions may similarly be removed in the direction of arrow 20 at slag-plasma interface 16. Alloy $M^{n+}$ may be added to metal 14 in the direction of arrow 22 at slag-metal interface 18 as follows:

$$M^{n+} + ne \rightarrow M \tag{22}$$

where M is the alloy added to metal 14.

These processes are limited by the substantially planar slag-metal interface 18, which does not allow scale-up for large industrial applications. In addition, process efficiency in terms of power requirement is inversely proportional to the thickness of the slag. Because slag thickness in industrial applications will be much greater than slag thickness in small laboratory scale systems, e.g. 1-2 orders greater, the efficiency of prior art systems such as those shown in FIG. 1 is greatly reduced in large scale operations. Further, the electrolytic nature of such prior art processes does not allow the plasma to penetrate into the metal.

Figure 2A:
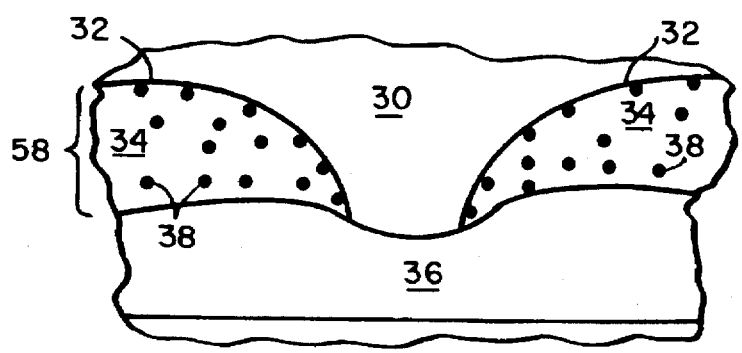
FIGS. 2a–2e illustrate alternative embodiments of the present invention.

Referring now to FIG. 2a, an embodiment in accordance with the present invention is illustrated. A slag-metal emulsion 58 including slag 34 and metal 38 is formed. Preferably, metal 38 is in the form of droplets. This is accomplished through gas agitation, stirring or the like. It should be noted however, that any manner of obtaining a dispersion is suitable for use in the present invention. As discussed above, metal droplets 38 have a space charge surrounding each droplet. For example, during steelmaking, this is attributed to the dissolution of oxygen ions in slag 34 into metal 36 through an oxidative electron transfer reaction. The space charge around droplets 38 result when the electrons generated from the dissolution of oxygen ions are not drained or consumed from the slag.

An AC or DC plasma arc or electric arc 30 is provided such that arc 30 penetrates into metal 36, thereby creating an electrical short. Consequently, no electrolysis occurs. Plasma-slag interface 32, however, is electrically conducting.

When metal droplets 38 strike slag-plasma interface 32, the space charge surrounding droplets 38 is discharged, allowing droplets 38 to react and approach equilibrium conditions with slag 34. It should be noted that the discharge of the space charge surrounding droplets 38 can be further enhanced by increasing the electronic conductivity or transport in slag 34 through addition of variable valency cations. While not meant to be limiting, transition metal ions such as iron, titanium, niobium, vanadium, cobalt, copper and the like are suitable for use in the present invention.

The system is agitated continuously, thereby causing additional slag 34 and metal droplets 38 to strike electrically conducting slag-plasma interface 32. The reaction continues until the entire or substantially entire slag-metal emulsion 40 approaches chemical equilibrium. Arc 30 is preferably moved within slag-metal emulsion 58 during the reaction process.

In this embodiment, the electrical energy is not used for electrolysis. Rather, electrical energy is utilized to create a plasma or electric arc which is electrically conducting. Electrically conductive slag-plasma interface 32 autogenously drives the slag-metal reaction towards chemical equilibrium. Applications suitable for use in accordance with this embodiment of the invention include, but are not limited to, decarburization, dephosphorization, desulfurization, deoxidation, alloying, iron carbide smelting and the like.

Figure 2B:
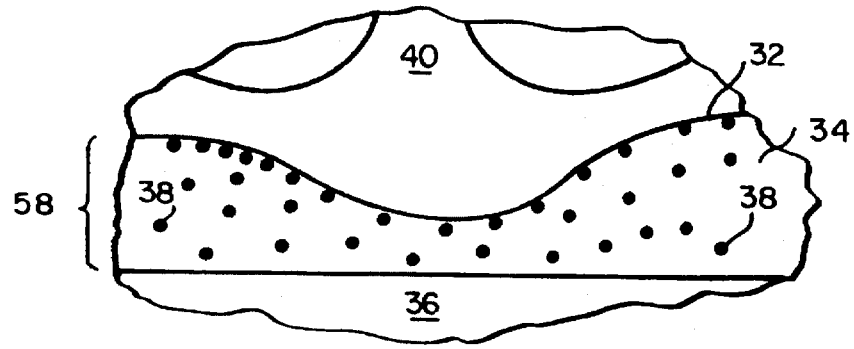

An alternative embodiment of the present invention is illustrated in FIG. 2b. In this embodiment, a slag-metal emulsion 58 is formed as described above with reference to the embodiment shown in FIG. 2a. An AC plasma 40 is applied over slag 34 without completely penetrating slag 34. No electrolysis occurs due to the nature of AC plasma 40, but plasma 40 imposes a potential drop across slag-metal dispersion 58. The charge build-up around droplets 38 is discharged, thereby enabling slag 34 and metal 36 to rapidly equilibrate. Additionally, plasma-slag interface 32 is electrically conducting as described in the preceding embodiment. When droplets 38 strike interface 32, droplets 38 discharge the space charge and react with slag 34 to reach chemical equilibrium. The system is agitated in an amount sufficient to maintain slag-metal emulsion 58. The agitation allows additional slag 34 and additional droplets 38 to strike slag-plasma interface 32. The reaction continues in this manner until the slag-metal system approaches chemical equilibrium.

As discussed above in reference to the embodiment shown in FIG. 2a, the discharge of the space charge surrounding droplets 38 can be further enhanced by increasing the electronic conductivity or transport in the slag through addition of variable valency cations. While not meant to be limiting, transition metal ions such as iron, titanium, niobium, vanadium, cobalt, copper and the like are suitable for use in the present invention.

In this embodiment, electrical energy is not used for electrolysis. Rather, electrical energy is utilized to form a plasma which is electrically conducting. The electrically conducting plasma-slag interface 32 and the potential drop across slag-metal dispersion 58 resulting from application of plasma 40 discharges the charge build-up surrounding metal droplets 38 and autogenously drives the slag-metal reaction to chemical equilibrium. While not intended to be limiting, this embodiment of the invention is also suitable for use in connection with decarburization, dephosphorization, desulfurization, deoxidation, alloying, iron carbide smelting and other similar processes.

Figure 2C:
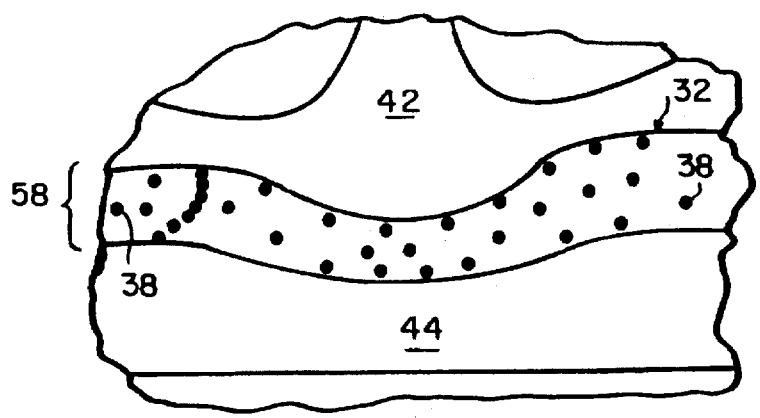

FIG. 2c illustrates another embodiment of the present invention which is suitable for use in connection with decarburization, dephosphorization, iron carbide smelting and the like. As discussed above with reference to the embodiments shown in FIGS. 2a-2b, slag-metal dispersion 58 is formed. In this embodiment, DC cathodic plasma arc 42 is applied over slag 34 without completely penetrating slag 34. This initiates partial electrolysis, causing negative ions such as oxygen to migrate to the metal 44, which serves as an anode. This results in some decarburization or other similar oxidation reactions. In addition, the charge build-up surrounding metal droplets 38 will be discharged by the potential drop across slag-metal dispersion 58 due to application of plasma 42. The charge build-up will also be discharged when metal droplets 38 strike electrically conducting plasma-slag interface 32.

The discharge surrounding metal droplets 38 can be further enhanced by increasing the electronic conductivity or transport in the slag through adequate additions of variable valency cations. While not meant to be limiting, transition metal ions such as iron, titanium, niobium, vanadium, cobalt, copper and the like are suitable for use in the present invention.

In this embodiment, electrical energy is not entirely used for electrolysis. Rather, electrical energy is utilized to form a plasma which is electrically conducting. The electrically conducting plasma-slag interface 32 and the potential drop across slag-metal dispersion 58 resulting from application of plasma 42 discharges the charge build-up surrounding metal droplets 38 and autogenously drives the slag-metal reaction to chemical equilibrium.

Figure 2D:
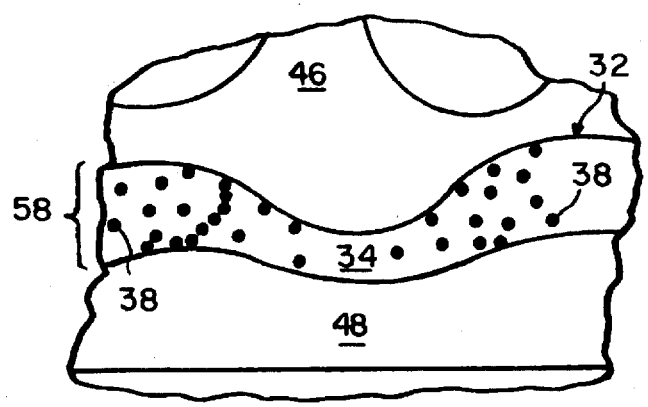

Desulfurization, deoxidation, alloying and the like are suitable processes for the embodiment of the invention illustrated in FIG. 2d. As with the other preceding embodiments, slag-metal dispersion 58 is formed. In this embodiment, however, a DC anodic plasma arc 46 is applied over slag 34 without completely penetrating slag 34. Partial electrolysis is thereby initiated and negative ions such as sulfur and oxygen migrate toward plasma-slag interface 32 while positive ions migrate toward cathodic metal 48. Some desulfurization, deoxidation and alloying will respectively result.

Additionally, the charge build-up associated with metal droplets 38 will be discharged by the potential drop across slag-metal dispersion 58 due to application of plasma 46. Further, the charge build-up of metal droplets 38 will be discharged upon striking electrically conducting plasma-slag interface 32.

As discussed above, the discharge surrounding metal droplets 38 can be further enhanced by increasing the electronic conductivity or transport in the slag through adequate additions of variable valency cations. While not meant to be limiting, transition metal ions such as iron, titanium, niobium, vanadium, cobalt, copper and the like are suitable for use in the present invention.

In this embodiment, electrical energy is not entirely used for electrolysis. Rather, electrical energy is utilized to form a plasma which is electrically conducting. The electrically conducting plasma-slag interface 32 and the potential drop across slag-metal emulsion 58 resulting from application of plasma 46 discharges the charge build-up surrounding metal droplets 38 and autogenously drives the slag-metal reaction to chemical equilibrium.

Figure 2E:
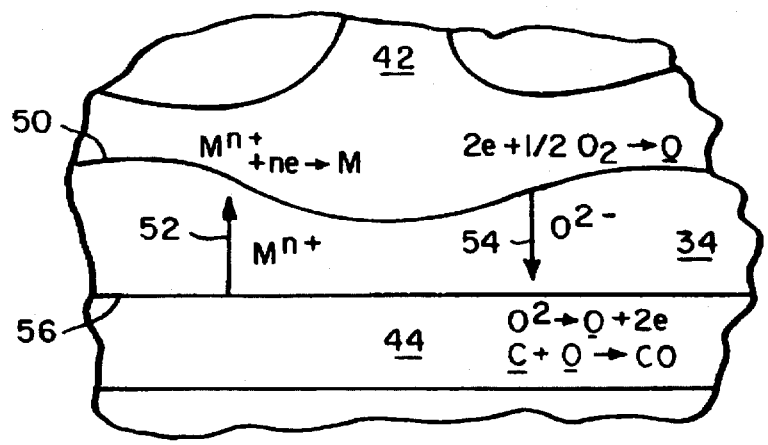

Referring now to FIG. 2e, an embodiment suitable for use in connection decarburization, dephosphorization, iron carbide smelting, and the like is shown. In this embodiment, no dispersion is formed. DC cathodic plasma arc 42 is applied over slag 34 without completely penetrating slag 34. Plasma 42 is controlled in a manner such that slag 34 is a thin layer, thereby separating plasma 42 and melt pool anodic metal 44. Electrolysis is thereby initiated and negative ions such as oxygen migrate toward metal 44 (in the direction of arrow 54). Decarburization of metal 44 and/or oxidation of some impurities in metal 44 occurs at slag-metal interface 56.

Positive ions migrate toward plasma 42 (in the direction of arrow 52), thereby resulting in a reductive reaction at plasma-slag interface 50. This reaction mechanism is suitable for processes such as iron carbide smelting and the like.

It should be noted that the electrical energy in this embodiment is used entirely for electrolysis. The amount of current passed in the system is directly proportional to the extent of refining. The embodiment depicted in FIG. 2e is suitable for small scale processes such as hearth refining of super alloys, or in operation in small batch processes.

Figure 3:
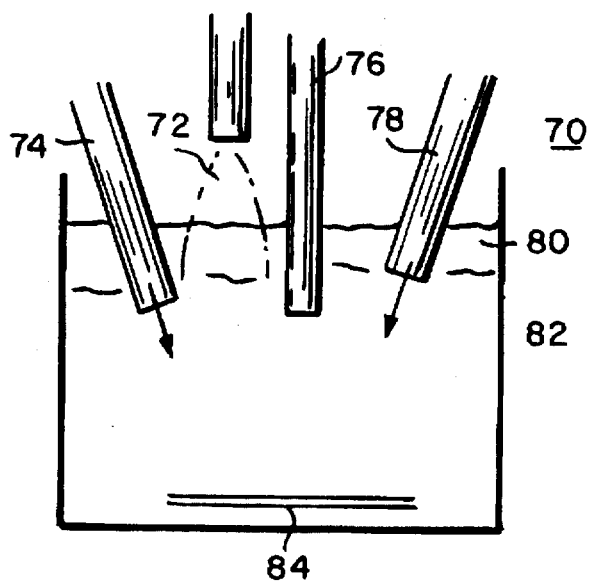
FIG. 3 shows a process for direct ironmaking in accordance with the teachings of the present invention.

FIG. 3 illustrates an embodiment of the invention suitable for use in direct ironmaking operations. Iron oxide 76, carbon 74 and oxygen 78 are injected into system 70. Slag-metal emulsion 80 is formed by agitating a slag and steel 82. Agitation is preferably by gas agitation. Bottom electrode 84 is preferably positioned at or near the bottom of steel layer 82.

Plasma or electric arc 72 is contacted with or impinged upon the surface of slag-metal emulsion 80. Plasma or electric arc 72 enhances the slag-metal reaction by discharging the space charge associated with metal droplets dispersed in the slag. It should be noted that when a DC plasma which does not penetrate the slag-metal emulsion is utilized, partial electrolysis further enhances the slag-metal reaction rate.

The embodiment illustrated in FIG. 3 thus enhances carbon oxidation in the metal, lowers iron oxide content in the slag and provides improved flexibility for the heat balance and required material feed rates. While the above embodiment has been discussed in relation to ironmaking, it should be appreciated that the process is also suitable for use in connection with processes for non-ferrous metals. These may include, but are not limited to copper, nickel, lead, zinc and the like (see, Examples 8 and 9).

Figure 4:
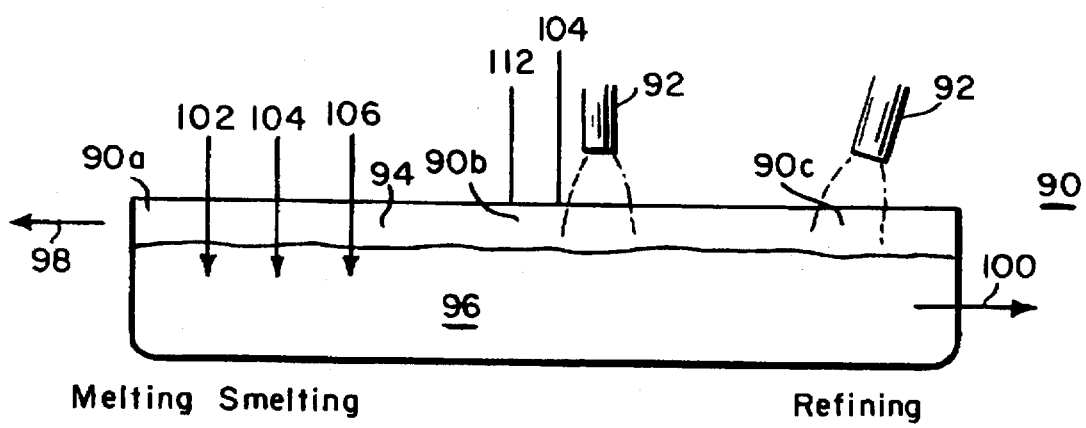
FIG. 4 illustrates a trough type of reactor suitable for use in direct steelmaking in accordance with the present invention.

Referring now to FIG. 4, a trough type reactor 90 is shown for use in direct steelmaking. Trough reactor 90, as illustrated in FIG. 4, includes three zones, 90a, 90b and 90c. Oxygen 102, iron oxide ($Fe_2O_3$) 104 and carbon 106 are introduced into one end of reactor 90, illustrated in FIG. 4 as zone 90a. Preferably, oxygen 102, iron oxide 104 and carbon 106 are injected into metal layer 96 such that iron with carbon in solution is produced. In the middle of reactor 90 (zone 90b in FIG. 4), reduced oxygen 112 and/or an inert gas such as argon and/or iron oxide 104 is injected into slag 94 to promote formation of a slag-metal dispersion. Decarburization and the like are promoted by impinging a plasma jet(s) or electric arc(s) 92 on the dispersion. At the second end or opposite end of reactor 90 (zone 90c in FIG. 4), an inert gas such as argon or $CO_2$ is also injected to form a slag-metal dispersion and plasma or electric arc 92 is impinged on the surface of the slag-metal dispersion. Plasma or electric arc 92 enhances the slag-metal reaction by discharging the space charge around metal droplets in the slag and also through partial electrolysis in the event a DC plasma is utilized and does not penetrate the slag.

The process variables in the zones of reactor 90 may be varied depending on the carbon requirement in the melt. Additionally, it should be appreciated that the number of zones may vary. In this manner, process design allows the reduction zone to gradually phase into the oxidation zone without any substantial physical barriers.

Figure 5:
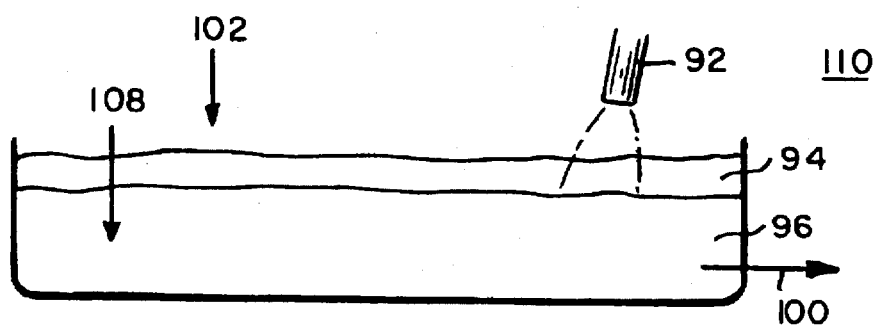
FIG. 5 illustrates a process for direct smelting of metal in accordance with the present invention.

FIG. 5 depicts an embodiment of the invention for use in connection with direct smelting processes. For purposes of brevity, the embodiment is exemplified with reference to iron carbides. It should be understood, however, that the process is suitable for use with other metals, including but not limited to copper, nickel, lead, zinc and the like.

Iron carbide 108 is introduced or fed into reactor 110. Preferably, the iron carbide feed is injected into metal layer 96 or slag-metal emulsion. Oxygen 102 is injected into the system. Iron oxide and/or oxygen and/or argon (not shown in FIG. 5) is subsequently introduced in order to form a slag-metal dispersion between metal 96 and slag 94. Plasma (s) or electric arc(s) 92 is then contacted with or impinged upon the slag-metal dispersion to facilitate decarburization and lower iron loss through lowered iron oxide content in the slag.

Plasma or electric arc 92 enhances the slag-metal reaction by discharging the space charge surrounding the metal droplets in the slag and through partial electrolysis in the event that a DC plasma which does not penetrate the slag is utilized.

As previously mentioned, this particular embodiment is not limited to decarburization of iron carbide melts. Other metallic compounds may also be used. The system illustrated in FIG. 5 may be operated on a batch or continuous mode.

Figure 6:
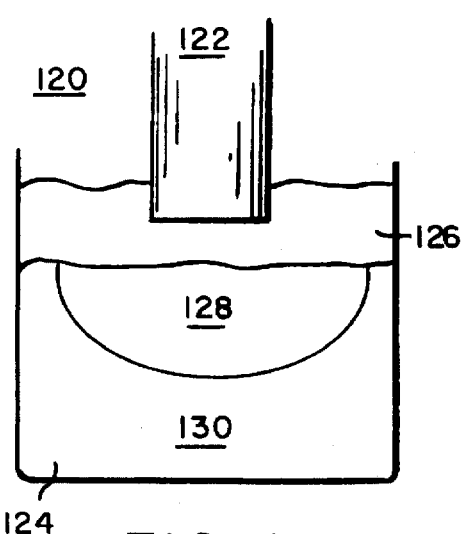
FIG. 6 shows the use of the present invention in connection with electro-slag refining (ESR) processes.

FIG. 6 illustrates the use of the present invention in connection with electro-slag refining (ESR) processes. ESR system 120 includes a consumable electrode 122 with an electric current passing therethrough. The electric current also passes through slag 126 and melt pool 128. Ingot 130 and electrode 124 are positioned beneath melt pool 128 in system 120.

The electric current facilitates the discharge of space charges surrounding droplets as the droplets fall through slag 126 into melt pool 128, thereby enhancing and driving the slag-metal reaction to equilibrium. To ensure slag-metal equilibrium, the residence time of the droplets in slag 126 may be increased by applying a magnetic field on system 120. Decarburization, dephosphorization, desulfurization and deoxidation of the melt drops using the ESR system may be accomplished by the above-described mechanisms.

Figure 7:
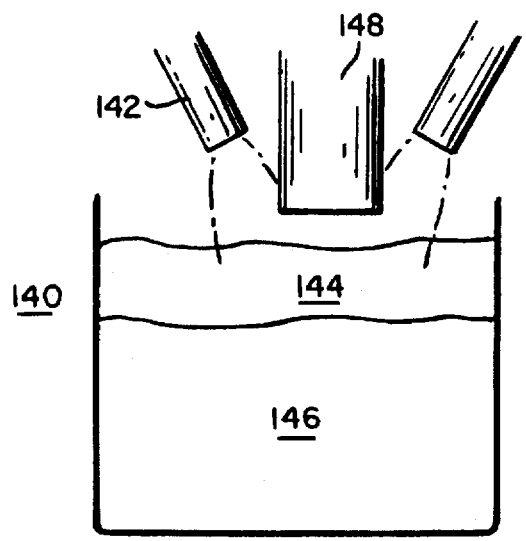
FIG. 7 shows the use of the present invention in connection plasma arc remelting (PAR) processes.

The present invention may also be used in conjunction with plasma arc remelting (PAR) to promote oxygen removal from the system as shown in FIG. 7. In this embodiment, PAR system 140 includes ingot 148, slag 144, metal 146 and plasma or electric arc 142. Plasma or electric arc 142 is preferably operated under vacuum, reducing gas and inert conditions. Plasma or electric arc 142 melts ingot 148, which is to be refined.

Plasma or electric arc 142 allows the space charge around the metal to be discharged as it falls through slag 144. As previously discussed, discharging the space charge enhances the slag-metal reaction and drives the reaction toward equilibrium.

EXAMPLES

The following prophetic examples utilize a DC or AC plasma or electric arc to provide an electronic pathway in the slag. When a DC plasma is utilized, space charge is discharged and migration of ionic species through partial electrolysis is accelerated. It is anticipated that the plasma will be accompanied by a substantially increased slag-metal interfacial area which may be formed by a slag-metal dispersion or emulsion through intense gas stirring or agitation.

Example 1

Figure 8:
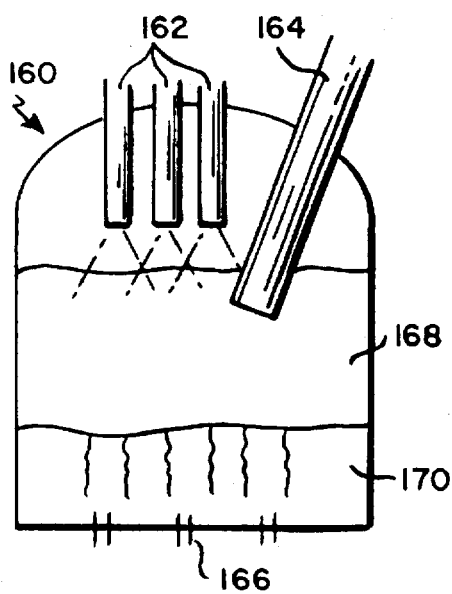
FIG. 8 illustrates the use of the present invention for various hybrid steelmaking processes.

During carbon and alloy steel making processes, a steel-making vessel such as that illustrated in FIG. 8 is charged with hot metal 170. The metal is maintained at conventional temperatures. For example, metal 170 is preferably maintained at a temperature of about 1500°–1700° C. and more preferably at about 1600° C. This is sufficient to ensure that metal 170 is in a molten state, and is within a temperature range which ensures protection of the surrounding refractory.

Metal 170 contains standard amounts of carbon, silicon, manganese and the like. Typical amounts may include less than about 5% by weight carbon, less than about 2% by weight silicon and less than about 2% by weight manganese. Scrap and/or iron carbide may be added in a predetermined ratio. For example, it is expected that about 0.3 kg. scrap/kg. hot metal, will be suitable for use. It should be noted that the iron carbide may also be introduced into the molten charge at any stage in the process.

Steelmaking vessel 160 is then charged with standard amounts of calcia based fluxes such as lime, iron ore and calcium fluoride. While not meant to be limiting, it is expected that suitable amounts of such fluxes may include 0.07 kg. lime/kg. metal, 0.03 kg. iron ore/kg. metal and 0.002 kg. calcium fluoride/kg. metal.

Oxygen 164 is then introduced into vessel 160 in any manner. For example, oxygen 164 may be introduced into the vessel 160 from the top using a lance or the like as shown in FIG. 8. Oxygen 164 may also be introduced into vessel 160 from the bottom utilizing tuyeres or the like. When oxygen 166 is blown into the bottom of vessel 160 as shown in FIG. 8, shielding hydrocarbon gases may also be used to cool and protect the surrounding refractory. Alternatively, oxygen may be introduced from both the top 164 and bottom 166, depending on the design of vessel 160. When oxygen is blown into the system using a combination of top and bottom blowing, the bottom flow rate may be less than about 50% of the top flow rate. While the rate of oxygen flow may vary, it is expected that about 2.2N liters/kg. steel-minute is suitable for use in accordance with the invention. These flow rates may also be used to assist in formation of slag-metal dispersion 168.

At any point after oxygen flow has started, plasma or electric arc 162 is initiated utilizing any one of the above-mentioned modes. Plasma or electric arc 162 is shown as electrodes 162 in FIG. 8. In this manner, it is expected that an electronic pathway will discharge the space charge around the metal droplets and when DC plasma is utilized, partial electrolysis will also occur. The slag-metal emulsion is maintained during the process by intense gas agitation.

Metal samples and slag samples are taken at regular intervals and gas analysis is performed during the entire process to monitor process control and to ensure that gas injections are stopped at the desired level of carbon. Such samples may be taken by any conventional means. For example, metal samples may be taken utilizing bomb and/or pin techniques or any other known method of taking such samples. Slag and metal temperatures should also be monitored during the process in order to evaluate thermal effects.

Example 2

Example 2 is similar to Example 1 except that plasma or electric arc 162, which is accompanied by intense gas stirring, also includes a simultaneous decrease in oxygen flow. It is expected that the decrease in oxygen flow will be accomplished in a predetermined manner in order to allow iron oxide in the slag to decarburize the bath without generating unnecessary excessive amounts of iron oxide. The manner by which the oxygen flow is decreased once the plasma is initiated is expected to be important. For example, as the oxygen flow is decreased, gas stirring from the top and/or bottom may be substituted by argon and/or carbon dioxide flow to maintain the slag-metal emulsion.

Example 3

Example 3 is similar to Examples 1 and 2, except that controlled amounts of iron oxide are injected in plasma stream 162. In this manner, the iron oxide in the plasma stream also decarburizes the bath.

In alternative embodiments of Examples 1–3, iron carbide may be charged continuously or periodically into the vessel during the heat and the use of plasma would ensure efficient removal of the carbon during the steelmaking process. Examples 1–3 combine oxygen steelmaking technology with an AC or DC plasma arc furnace, as shown in FIG. 8. These processes are expected to be very flexible and more efficient than existing oxygen blow techniques. For example, the present invention is expected to provide a slag having a lower FeO content (possibly much less than 20%). Consequently, the yield of the process increases, the slag volume is lower and the oxygen and nitrogen contents in the metal are lowered. Additionally, processing times and oxygen requirements are expected to be lower than processes in accordance with the prior art.

Example 4

Decarburization of iron may also be performed as discussed in Examples 1–3 in a ladle furnace. It should be noted that modifications to the ladle furnace may be required in order to permit gas stirring. While not meant to be limiting, gas stirring at a rate of about 0.1–3.0N liters/kg metal-minute is expected to be sufficient to form a slag-metal emulsion.

Example 5

Figure 9:
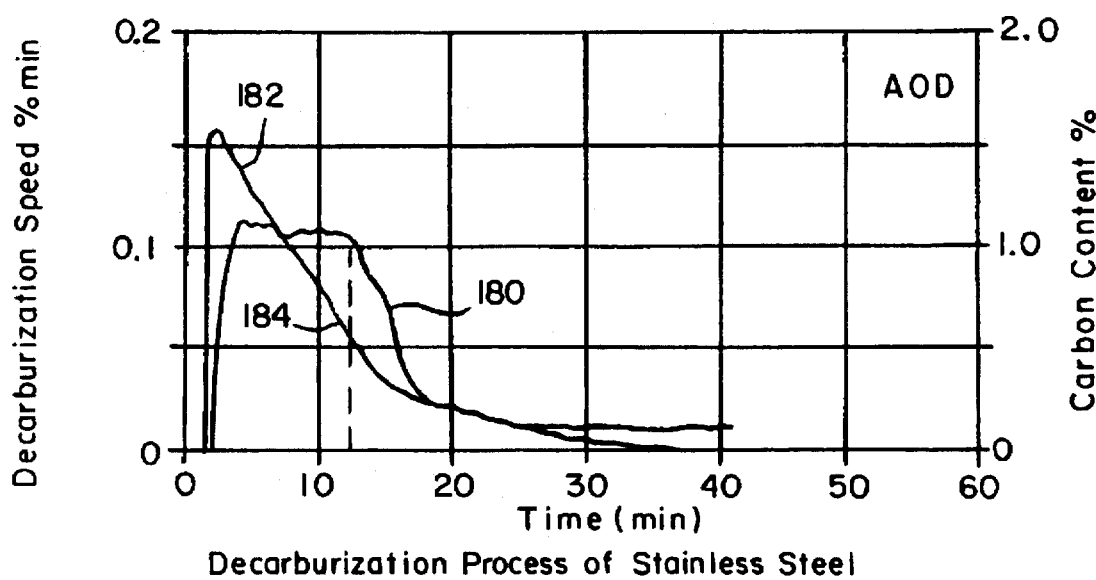
FIGS. 9 and 10 shows carbon oxidation rates as a function of time in AOD and VOD processes, respectively.
Figure 10:
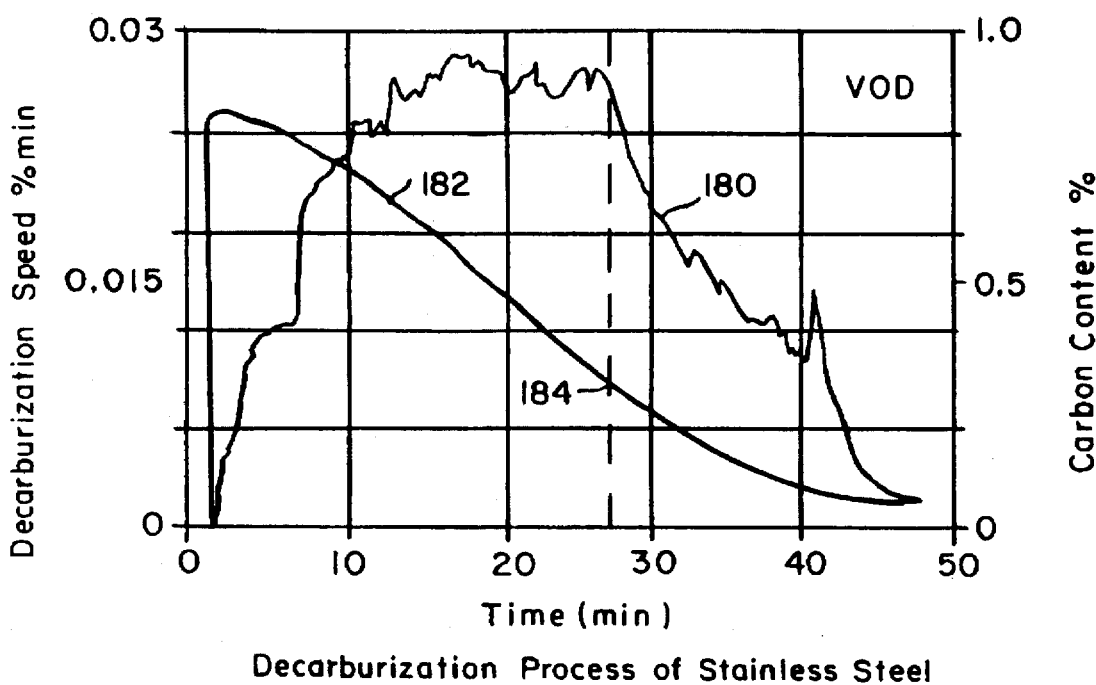

FIGS. 9–10, which have been adopted from Reichel et al., *Proceedings of the* 1994 *Electric Arc Furnace Conference*, The Iron and Steel Society, illustrate carbon oxidation rates in argon-oxygen decarburization (AOD) and vacuum-oxygen decarburization (VOD) processes, respectively. As further shown in FIGS. 9–10, the carbon oxidation rate 180, i.e., dC/dt, characteristically increases initially and then carbon content reaches a plateau. Thereafter, the carbon oxidation rate 180 decreases as the process continues. The transition from the plateau to the diminishing decarburization rate is identified as $C_{crit}$ or 184 in FIGS. 9–10.

The present invention is expected to overcome the shortcomings associated with AOD and VOD processes by the following. A conventional AOD or VOD process is initiated and operated until the diminishing carbon oxidation rate or $C_{crit}$ 184 is reached or approached. At that point, a plasma or an electric arc as previously described is introduced into the system. Alternatively, electrodes positioned in the system are turned on and the oxygen supply is substantially reduced, while maintaining or increasing the argon flow rate. In this manner, chromium recovery is substantially increased. Additionally, the oxidation of iron is minimized. Productivity is also increased by decreasing heat times.

Example 6

In an AC or DC arc furnace suitable for conventional steelmaking, the initial charge is adjusted such that additional sources of carbon are provided. This may be accomplished by the use of iron carbides, pig iron and the like. After the metallic charge has been melted, oxygen flow is turned off and intense agitation is provided. Any method of agitation is expected to be suitable so long as a slag-metal emulsion results. For example, agitation may be provided by bottom tuyeres, lances, argon, carbon dioxide or other suitable gases. The electronic pathways are expected to rapidly reduce the iron oxide content of the slag and simultaneously lower the carbon and oxygen contents of the metal. It should also be noted that the slag composition may also be modified to aid in desulfurization.

Example 7

Figure 11:
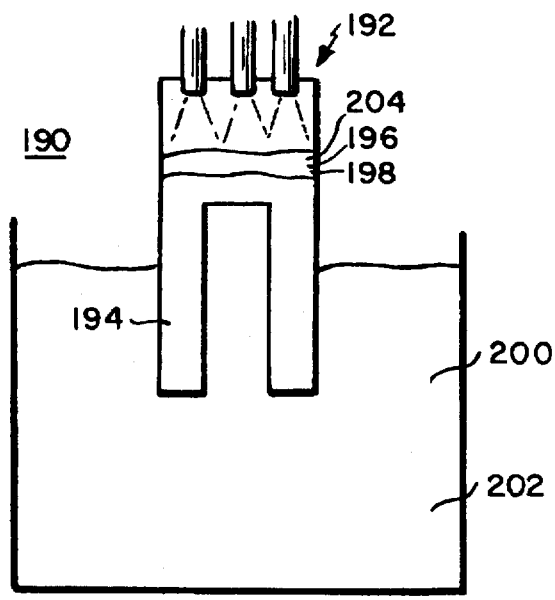

The present invention is also anticipated to be suitable for use in connection with R-H degassing techniques. As shown in FIG. 11, system 190 includes ladle or vessel 202 and snorkel 194. Arc 192 and inert gas 204 are introduced to provide slag-metal-gas dispersion 198 and steel 200. Oxygen 196 is introduced in dispersion 198. In this example, arc 192 promotes the decarburization reaction. In addition, arc 192 provides the necessary thermal energy to compensate for cooling. A 5–10 mega-watt plasma is anticipated to be sufficient for a typical 100–200T installation.

Example 8

Figure 12A:
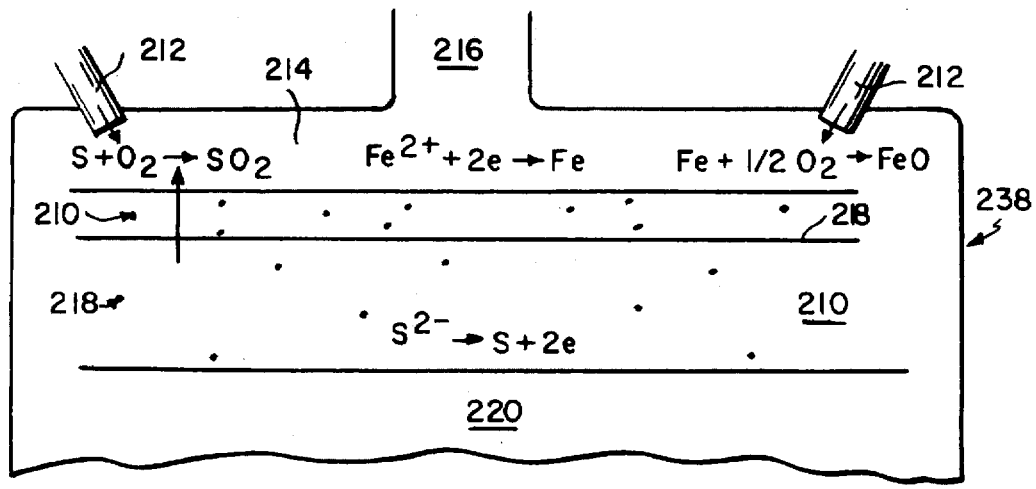
FIGS. 12a and 12b show the use of the present invention in connection with metals extraction processes.
Figure 12B:
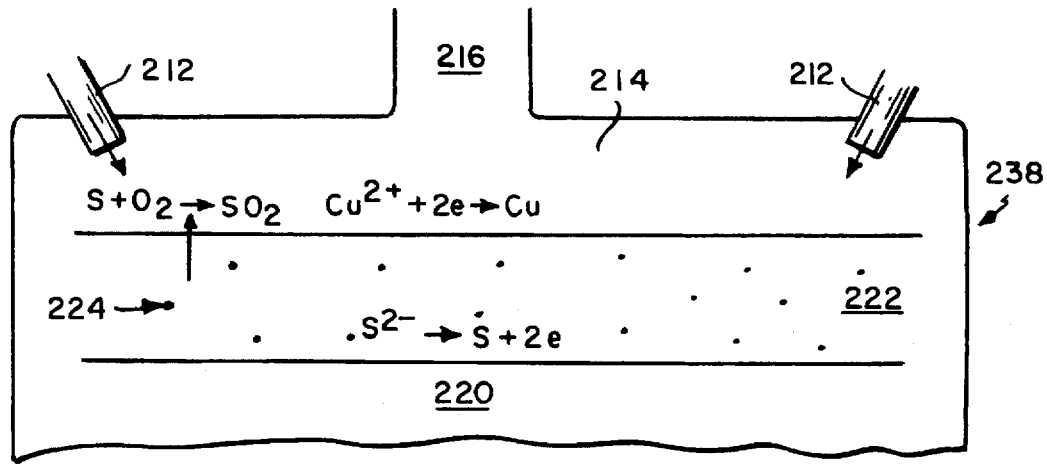

Referring now to FIGS. 12a and 12b, the expected use of the present invention for metals extraction processes such as copper smelting is shown. As shown in FIG. 12a, sulfides of copper and iron (matte) 210 are charged together with the usual slag forming fluxes into vessel 238 and oxygen flow 212 is initiated. While not intended to be limiting, slag forming fluxes may be lime and/or silica based. Plasma 216 impinges or contacts the surface of the matte/flux system and accelerates the oxidation of the iron sulfide into iron oxide which forms part of slag 218 by reacting with the flux.

The slag is raked and a portion of slag 218 may be recycled as the initial charge. As shown in FIG. 12b, subsequent oxygen blow 212 and plasma 216 are continued such that copper sulfide matte 222 is oxidized into copper 224 and the sulfur is removed through gas phase 214 as an oxide of sulfur. A dispersion of slag 218, matte 210 and metal 220 is preferably formed with supplemental gas stirring to create an emulsion for increasing the interfacial surface area for reaction. In this case, metal 220 is anodic and plasma 216 is cathodic. Copper smelting reactions can thus be written as:

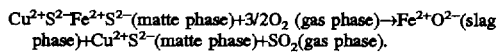

$Cu^{2+}S^{2-}$–$Fe^{2+}S^{2-}$(matte phase)+3/2$O_2$ (gas phase)→$Fe^{2+}O^{2-}$(slag phase)+$Cu^{2+}S^{2-}$(matte phase)+$SO_2$(gas phase).

The above reaction continues as follows:

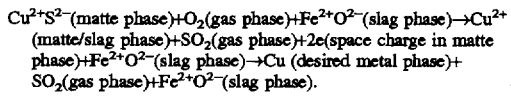

$Cu^{2+}S^{2-}$(matte phase)+$O_2$(gas phase)+$Fe^{2+}O^{2-}$(slag phase)→$Cu^{2+}$ (matte/slag phase)+$SO_2$(gas phase)+2e(space charge in matte phase)+$Fe^{2+}O^{2-}$(slag phase)→Cu (desired metal phase)+ $SO_2$(gas phase)+$Fe^{2+}O^{2-}$(slag phase).

While the example illustrates copper smelting processes (extraction from matte/slag), it should be noted that the extraction process in accordance with the present invention is also suitable for other extractions. For example, the extraction process may be utilized to extract non-ferrous metals as well as ferrous metals. While not intended to be limiting, such metals include zinc, lead, nickel and the like. In these circumstances, a sulfide of zinc, lead, nickel, or iron is reacted to form the respective oxide, i.e., zinc oxide, lead oxide or nickel oxide. The oxide is then reduced to zinc, lead or nickel, respectively. The reducing agent may be carbon, hydrogen or the like. For example, zinc may be extracted as follows:

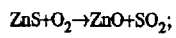

$ZnS+O_2 \rightarrow ZnO+SO_2$;

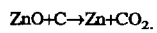

$ZnO+C \rightarrow Zn+CO_2$.

Example 9

Iron scrap contaminated with copper is used to illustrate the anticipated recycling of metals in accordance with the present invention. It should be noted, however, that the recycling process in accordance with the present invention may also be used with other non-ferrous metals. For example and while not meant to be construed as limiting, lead, nickel, zinc and the like are suitable for use in the recycling process.

Figure 13:
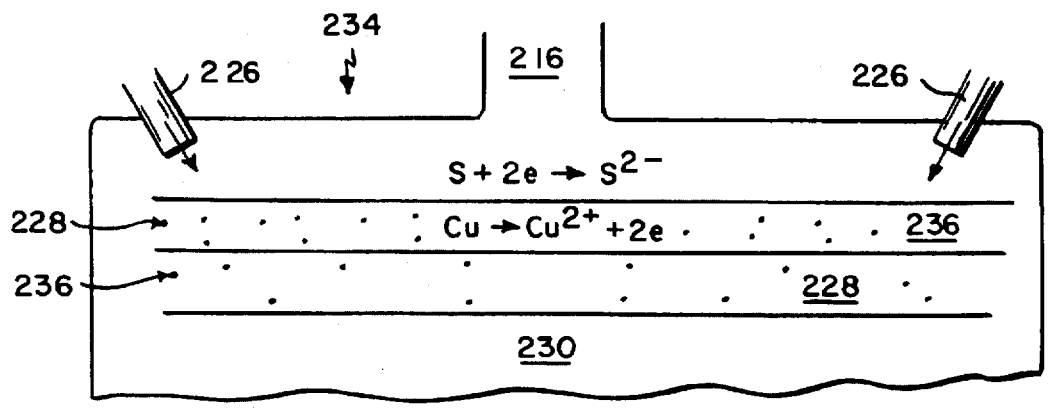
FIG. 13 illustrates the use of the present invention for metals recycling operations.

Iron scrap 228 and slag forming fluxes are charged into plasma furnace 234 as shown in FIG. 13. Plasma furnace 234 is preferably a DC plasma furnace. Sulfur containing gases 226 or other sulfur additives are introduced into the system. The system is stirred by intense gas stirring to create a slag-metal emulsion 236.

Plasma 216 accelerates the ionization of sulfur 226 and its migration through the slag toward the metal phase where it reacts with the copper to form a copper sulfide. The copper sulfide is absorbed in the slag and the copper is thus removed from the iron. In this case, plasma 216 is cathodic and anode 230, which may be the metal, is preferably positioned below the metal phase. The reaction may be written as follows:

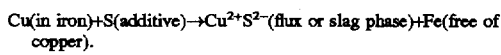

Cu(in iron)+S(additive)→$Cu^{2+}S^{2-}$(flux or slag phase)+Fe(free of copper).

It should be appreciated by those skilled in the art that the specific embodiments disclosed above may readily be utilized as a basis for modifying or designing other methods or structures for carrying out the same purpose of the present invention. It should also be realized by those skilled in the art that such equivalent constructions do not depart from the spirit and scope of the invention as set forth in the appended claims.

What is claimed is:

1. A process for enhancing reactions between a molten metal and a slag comprising:
    contacting the slag and the molten metal such that at least a portion of the metal is dispersed in the slag, thereby generating a slag-metal dispersion;
    discharging space charge within the slag-metal dispersion by contacting the slag-metal dispersion with arc means; and
    maintaining and regenerating the slag-metal dispersion such that additional space charges in the slag-metal dispersion are discharged.

2. The process of claim 1, wherein the arc means comprises a plasma arc.

3. The process of claim 1, wherein the arc means does not penetrate the molten metal.

4. The process of claim 1, wherein the arc means comprises an electric arc.

5. The process of claim 1, wherein the arc means penetrates the molten metal.

6. The process of claim 1, wherein the dispersed metal is in the form of droplets.

7. The process of claim 6, wherein the space charges in the dispersion surround the metal droplets.

8. The process of claim 1, wherein the dispersion contains at least 5–50% by weight metal dispersed in the slag.

9. The process of claim 1, wherein the process is steelmaking and the dispersion is maintained at a temperature of about 1500°–1700° C.

10. The process of claim 9, wherein the temperature of the dispersion is maintained at about 1600° C.

11. The process of claim 1, wherein the metal contains iron.

12. The process of claim 1, further including adding variable valency cations to the slag such that electrons in the slag are consumed or generated and the discharges of the space charges are thereby enhanced.

13. The process of claim 12, wherein the variable valency cations are selected from the group consisting of iron, titanium, niobium, vanadium, cobalt and copper.

14. The process of claim 1, wherein the slag-metal reaction is decarburization.

15. The process of claim 1, wherein the slag-metal reaction is dephosphorization.

16. The process of claim 1, wherein the slag-metal reaction is desulfurization.

17. The process of claim 1, wherein the slag-metal reaction is deoxidation.

18. The process of claim 1, wherein the slag-metal reaction is alloy addition.

19. The process of claim 1, wherein the process is smelting.

20. The process of claim 19, wherein the smelting is iron carbide smelting.

21. The process of claim 1, wherein the dispersion is generated and maintained by gas agitation.

22. A process for enhancing reactions during metals recycling operations, comprising:
    (a) combining metal scrap and slag forming fluxes, the metal scrap having at least one component to be refined therein;
    (b) introducing at least one additive into the metal scrap and the slag forming fluxes;
    (c) generating a slag-metal dispersion with the slag forming fluxes, the metal scrap and the at least one additive;
    (d) contacting the dispersion with arc means such that space charges within the slag-metal dispersion are discharged and such that the at least one additive reacts with the at least one component in the metal scrap to form a compound which is absorbed into the slag, thereby removing the at least one component from the metal scrap; and
    (e) maintaining and regenerating the slag-metal dispersion such that additional space charges in the slag-metal dispersion are discharged.

23. The process of claim 21, wherein the gas is selected from the group consisting of oxygen, argon, carbon dioxide, nitrogen and mixtures thereof.

24. The process of claim 23, wherein the gas is injected at a rate of about 2.2N liters/kg metal-minute.

25. The process of claim 21, wherein the gas is substituted with a second gas during the process.

26. The process of claim 25, wherein the second gas is selected from the group consisting of argon, carbon dioxide, nitrogen and mixtures thereof.

27. The process of claim 23, wherein the oxygen flow rate is decreased at a preselected rate during the process.

28. The process of claim 27, further including providing substitute gas sufficient to maintain the dispersion as the oxygen flow is decreased.

29. The process of claim 28, wherein the substitute gas is selected from the group consisting of: argon, carbon dioxide, nitrogen and mixtures thereof.

30. The process of claim 29, wherein the substitute gas is argon.

31. A process for increasing carbon oxidation in a metal melt, comprising:
    contacting a slag having iron oxides therein and the metal melt such that at least a portion of the metal is dispersed in the slag, thereby forming a slag-metal dispersion containing metal droplets suspended in the slag;
    discharging space charge within the slag-metal dispersion by contacting the slag-metal dispersion with arc means such that carbon is oxidized and removed from the metal melt; and
    maintaining and regenerating the slag-metal dispersion such that additional space charges in the slag-metal dispersion are discharged.

32. The process of claim 31, wherein the arc means comprises a plasma arc.

33. The process of claim 31, wherein the arc means comprises an electric arc.

34. The process of claim 31, wherein the dispersion is formed and maintained by gas agitation.

35. The process of claim 34, wherein the gas agitation is injected through at least one tuyere.

36. The process of claim 34, wherein the gas is injected through a plug.

37. The process of claim 34, wherein the gas is injected through at least one lance.

38. The process of claim 31, wherein the metal contains iron.

39. The process of claim 31, further including injecting iron oxide into the slag.

40. The process of claim 39, wherein the iron oxide is injected through a submerged lance.

41. The process of claim 31, further including injecting oxygen into the system such that the oxygen facilitates the generation and maintenance of the dispersion and reacts with the metal.

42. The process of claim 41, wherein the oxygen is injected through a submerged lance.

43. The process of claim 39, further including injecting oxygen into the system such that the oxygen facilitates the generation and maintenance of the dispersion and reacts with the metal.

44. The process of claim 43, wherein the oxygen is injected through a submerged lance.

45. The process of claim 31, wherein the process is an argon-oxygen decarburization (AOD) process.

46. The process of claim 45, further including injecting iron oxide into the slag.

47. The process of claim 46, wherein the iron oxide is injected through a submerged lance.

48. The process of claim 31, wherein the process is a vacuum oxidation decarburization (VOD) process.

49. The process of claim 48, further including injecting iron oxide into the slag.

50. The process of claim 31, wherein the process is a vacuum degassing process.

51. The process of claim 50, further including injecting iron oxide into the slag.

52. The process of claim 31, wherein the process is a basic oxygen process (BOP).

53. The process of claim 52, further including injecting iron oxide into the slag.

54. The process of claim 53, wherein the iron oxide is injected through a submerged lance.

55. The process of claim 52, further including injecting oxygen into the system at a preselected flow rate such that the oxygen facilitates the generation and maintenance of the dispersion and reacts with the metal.

56. The process of claim 55, wherein the oxygen flow rate is decreased at a preselected rate during the process.

57. The process of claim 55, further including injecting iron oxide into the slag.

58. The process of claim 57, wherein the iron oxide is injected through a submerged lance.

59. The process of claim 31, further including adding variable valency cations to the slag such that electrons in the slag are consumed or generated and the discharges of the space charges are thereby enhanced.

60. The process of claim 59, wherein the variable valency cations are selected from the group consisting of iron, titanium, niobium, cobalt and copper.

61. A process for enhancing reactions during copper smelting processes, comprising:
(a) combining a matte having sulfides of copper and iron with slag forming fluxes to form a matte-flux system;
(b) contacting the matte-flux system with an oxidizing agent and arc means such that the iron sulfide is oxidized and forms a slag with the flux;
(c) oxidizing the copper sulfide into copper and sulfur containing gases;
(d) substantially simultaneous with steps (a)-(c), generating a dispersion with the matte, the slag and a metal and contacting the dispersion with arc means such that space charges within the dispersion are discharged; and
(e) maintaining and regenerating the slag-metal dispersion such that additional space charges in the slag-metal dispersion are discharged.

62. The process of claim 61, wherein the oxidizing agent is oxygen.

63. A process for enhancing reactions during metals extraction processes, comprising:
(a) combining a matte having metal sulfides with slag forming fluxes to form a matte-flux system;
(b) contacting the matte-flux system with an oxidizing agent and arc means such that the metal sulfide forms a metal oxide in a slag;
(c) reducing the metal oxide into the corresponding metal;
(d) substantially simultaneous with steps (a)-(c), generating a dispersion with the matte and the slag and contacting the dispersion with arc means such that space charges within the dispersion are discharged; and
(e) maintaining and regenerating the slag-metal dispersion such that additional space charges in the slag-metal dispersion are discharged.

64. The process of claim 63, wherein the metal sulfide is selected from the group consisting of sulfides of: zinc, lead and nickel.

65. The process of claim 63 or 64, wherein the reducing agent is selected from the group consisting of carbon containing compounds and hydrogen containing compounds.

66. The process of claim 22, wherein the arc means comprises an electric arc.

67. The process of claim 22, wherein the at least one component in the metal scrap is selected from the group consisting of copper, zinc, lead and nickel.

68. The process of claim 22 or 67, wherein the metal scrap comprises iron scrap.

69. The process of claim 22 or 23, wherein the at least one additive is a sulfur additive.

70. The process of claim 22, wherein the dispersion is generated by gas agitation.

71. The process of claim 61, wherein the arc means comprises a plasma arc.

72. The process of claim 61, wherein the arc means comprises an electric arc.

73. The process of claim 63, wherein the arc means comprises a plasma arc.

74. The process of claim 63, wherein the arc means comprises an electric arc.

75. The process of claim 22, wherein the arc means comprises a plasma arc.

* * * * *

UNITED STATES PATENT AND TRADEMARK OFFICE
CERTIFICATE OF CORRECTION

PATENT NO. : 5,700,308

DATED : December 23, 1997

INVENTOR(S) : Uday B. Pal and Julian Szekely

It is certified that error appears in the above-indentified patent and that said Letters Patent is hereby corrected as shown below:

Column 1, line 35: please delete "C"; and insert therefor --$\underline{C}$--.

Column 1, line 37: please delete "S"; and insert therefor --$\underline{S}$--.

Column 1, line 37: please delete "O"; and insert therefor --$\underline{O}$--.

Column 1, line 39: please delete "20"; and insert therefor --2$\underline{O}$--.

Column 1, line 41: please delete "C, S and O"; and insert therefor --$\underline{C}$, $\underline{S}$ and $\underline{O}$--.

Column 6, line 14: please delete "Q"; and insert therefor --$\underline{O}$--.

Column 6, line 18: please delete "C+O"; and insert therefor --$\underline{C}$+$\underline{O}$--.

Column 6, line 19: please delete "C and O"; and insert therefor --$\underline{C}$ and $\underline{O}$--.

Column 6, line 27: please delete "O"; and insert therefor --$\underline{O}$--.

Column 6, line 61: please delete "enhances"; and insert therefor --enhance--.

Column 7, line 1: please delete "P"; and insert therefor --$\underline{P}$--.

Column 7, line 3: please delete "P"; and insert therefor --$\underline{P}$--.

Column 7, line 29: please delete "S"; and insert therefor --$\underline{S}$--.

UNITED STATES PATENT AND TRADEMARK OFFICE
CERTIFICATE OF CORRECTION

PATENT NO.   : 5,700,308
DATED        : December 23, 1997
INVENTOR(S)  : Uday B. Pal and Julian Szekely It is certified that error appears in the above-indentified patent and that said Letters Patent is hereby corrected as shown below:

Column 7, line 31: please delete "S"; and insert therefor --$\underline{S}$--.

Column 7, line 60: please delete "O"; and insert therefor --$\underline{O}$--

Column 7, line 62: please delete "O"; and insert therefor --$\underline{O}$--.

Column 8, line 15: please delete "M" and insert therefor --$\underline{M}$--.

Column 8, line 17: please delete "M"; and insert therefor --$\underline{M}$--.

Column 8, line 47: please delete "S"; and insert therefor --$\underline{S}$--.

Column 8, line 49: please delete "S"; and insert therefor --$\underline{S}$--.

Column 8, line 49: please delete "S"; and insert therefor --$\underline{S}$--.

Column 8, line 61: please delete "M" and insert therefor --$\underline{M}$--.

Column 8, line 63: please delete "M"; and insert therefor --$\underline{M}$--.

Column 13, line 42: after "metal", please delete ".".

UNITED STATES PATENT AND TRADEMARK OFFICE
CERTIFICATE OF CORRECTION

PATENT NO. : 5,700,308
DATED : December 23, 1997
INVENTOR(S) : Uday B. Pal and Julian Szekely It is certified that error appears in the above-indentified patent and that said Letters Patent is hereby corrected as shown below:

In Claim 69, line 1: please delete "23"; and insert therefor --67--.

Signed and Sealed this

Seventh Day of July, 1998

Attest:

BRUCE LEHMAN

*Attesting Officer*  *Commissioner of Patents and Trademarks*